(12) United States Patent
Alban et al.

(10) Patent No.: US 10,890,273 B2
(45) Date of Patent: Jan. 12, 2021

(54) SUPPORT STRUCTURE FOR SUPPORTING A CABLE

(71) Applicant: Preformed Line Products Co., Mayfield Village, OH (US)

(72) Inventors: Rebecca Marie Alban, Columbia Station, OH (US); Andrew James Hanneman, Mayfield Heights, OH (US); Phillip Steven Vargo, Lyndhurst, OH (US); Bruno Aldo Maiano, Chevreuse (FR); Théo Dominique Lambert, Mantes-la-Jolie (FR)

(73) Assignee: Preformed Line Products Co., Mayfield Village, OH (US)

( * ) Notice: Subject to any disclaimer, the term of this patent is extended or adjusted under 35 U.S.C. 154(b) by 0 days.

(21) Appl. No.: 15/605,880

(22) Filed: May 25, 2017

(65) Prior Publication Data
US 2017/0343134 A1   Nov. 30, 2017

Related U.S. Application Data

(60) Provisional application No. 62/341,335, filed on May 25, 2016.

(51) Int. Cl.
*F16L 3/12* (2006.01)
*F16G 11/02* (2006.01)
(Continued)

(52) U.S. Cl.
CPC ............ *F16L 3/1226* (2013.01); *F16G 11/02* (2013.01); *F16G 11/146* (2013.01); *F16L 3/06* (2013.01);
(Continued)

(58) Field of Classification Search
CPC ......... F16L 3/1226; F16L 3/1211; F16L 3/06; F16L 3/08; F16L 3/26; F16L 11/146;
(Continued)

(56) References Cited

U.S. PATENT DOCUMENTS 2,100,569 A   10/1935   Russell
2,241,221 A    5/1941   Russell
(Continued)

FOREIGN PATENT DOCUMENTS

AR   043527 A1    8/2005
BE   897606 A  * 12/1983  ............ F16L 3/1226
(Continued)

OTHER PUBLICATIONS

Int. Search Report/Written Opinion cited in PCT Application No. PCT/US2017/034580 dated Aug. 31, 2017, 13 pgs.
(Continued)

*Primary Examiner* — Eret C McNichols
(74) *Attorney, Agent, or Firm* — Cooper Legal Group, LLC

(57) ABSTRACT

A support structure is provided for supporting a cable. The support structure includes a body portion extending circumferentially about an axis. The body portion includes a first wall, a second wall extending substantially parallel to the first wall, and a third wall coupled between the first wall and the second wall. The first wall, the second wall, and the third wall define an opening extending along a circumferential length of the body portion. The body portion receives the cable within the opening. A retention structure is coupled to the first wall and projects from the first wall towards the second wall. The retention structure extends substantially parallel to the third wall. The retention structure retains the cable within the opening.

20 Claims, 6 Drawing Sheets

(51) Int. Cl.
    *F16G 11/14*  (2006.01)
    *F16L 3/06*   (2006.01)
    *F16L 3/08*   (2006.01)
    *F16L 3/26*   (2006.01)
    *F24D 3/14*   (2006.01)

(52) U.S. Cl.
    CPC .............. *F16L 3/08* (2013.01); *F16L 3/1211* (2013.01); *F16L 3/26* (2013.01); *F24D 3/141* (2013.01); *Y10T 403/4327* (2015.01); *Y10T 403/4336* (2015.01); *Y10T 403/4345* (2015.01); *Y10T 403/4354* (2015.01); *Y10T 403/4363* (2015.01)

(58) Field of Classification Search
    CPC .... F16L 11/02; F24D 3/141; Y10T 403/4327; Y10T 403/4336; Y10T 403/4354; Y10T 403/4363; Y10T 403/4345
    USPC .......................................... 248/693; 403/210
    See application file for complete search history.

(56) References Cited

U.S. PATENT DOCUMENTS

| | | | |
|---|---|---|---|
| 2,354,280 A | 7/1944 | Russell | |
| 2,858,590 A * | 11/1958 | Koch | F16L 3/1226 174/135 |
| 3,174,780 A | 3/1965 | Shapiro | |
| 5,523,529 A * | 6/1996 | Holliday | H02G 3/0418 138/163 |
| 5,939,680 A * | 8/1999 | Gretz | H02G 3/26 174/135 |
| 6,234,429 B1 * | 5/2001 | Yang | B60R 16/0215 248/68.1 |
| 6,325,336 B1 * | 12/2001 | Coykendall | F16L 3/04 248/68.1 |
| 6,399,883 B1 * | 6/2002 | Lhota | H02G 3/263 174/101 |
| 6,467,734 B1 * | 10/2002 | Brown | E03C 1/021 248/65 |
| 6,567,602 B2 * | 5/2003 | Cole | G02B 6/4459 385/136 |
| 6,809,266 B1 * | 10/2004 | Hoi | H02G 1/085 174/135 |
| 6,885,805 B2 * | 4/2005 | Asada | G02B 6/4459 385/134 |
| 7,038,133 B2 * | 5/2006 | Arai | H02G 3/0418 138/115 |
| 7,434,769 B1 * | 10/2008 | May | F16M 11/10 174/68.1 |
| 8,613,411 B1 * | 12/2013 | Mohns | F16L 3/1226 174/135 |
| 9,265,345 B2 * | 2/2016 | Lindblom | A47F 5/101 |
| 9,463,867 B2 * | 10/2016 | Langlade | B64C 1/406 |
| 9,598,028 B2 * | 3/2017 | Renner | H02G 3/0608 |
| 10,312,672 B2 * | 6/2019 | Baldwin | F16L 3/1226 |
| 2002/0039476 A1* | 4/2002 | Sauve | G02B 6/4478 385/134 |
| 2003/0085326 A1* | 5/2003 | Simonson | F16L 3/1226 248/51 |
| 2007/0001080 A1* | 1/2007 | Marioni | F16L 3/003 248/309.1 |
| 2007/0034750 A1* | 2/2007 | Pierce | F16L 3/1218 248/49 |
| 2008/0116324 A1* | 5/2008 | Holder | F16L 3/1226 248/65 |
| 2015/0211660 A1* | 7/2015 | Rice | F16L 3/1226 248/75 |
| 2016/0334032 A1* | 11/2016 | Foster | F16L 43/02 |
| 2017/0021724 A1* | 1/2017 | Eulitz | B60K 15/01 |
| 2018/0283582 A1* | 10/2018 | Lopez | A62B 1/18 |

FOREIGN PATENT DOCUMENTS

| | | | |
|---|---|---|---|
| BR | PI0400353 A | 10/2005 | |
| CH | 598527 A5 * | 4/1978 | F16L 3/1226 |
| CN | 101473501 A | 7/2009 | |
| CN | 102870302 A | 1/2013 | |
| CN | 203641395 U | 6/2014 | |
| DE | 944227 | 6/1956 | |
| DE | 102005053391 A1 * | 5/2007 | F16L 3/02 |
| DE | 102006059350 A1 * | 6/2008 | F16L 3/1025 |
| DE | 102007010241 A1 * | 9/2008 | B60H 1/00571 |
| DE | 202010002263 U1 * | 6/2011 | F16L 3/1226 |
| EP | 2543786 A1 * | 1/2013 | E04B 5/48 |
| FR | 2844111 B1 | 11/2004 | |
| FR | 2957154 B1 | 4/2012 | |
| FR | 2963493 B1 | 7/2012 | |
| FR | 2957155 B1 | 8/2012 | |
| FR | 2963173 B1 | 9/2012 | |
| FR | 2960104 B1 | 5/2013 | |
| FR | 2994620 A1 | 2/2014 | |
| FR | 3002217 A1 | 8/2014 | |
| FR | 3008495 A1 | 1/2015 | |
| FR | 3009293 A1 | 2/2015 | |
| FR | 3083378 A1 * | 1/2020 | H02G 7/056 |
| GB | 831339 A * | 3/1960 | F16L 3/1226 |
| GB | 2385213 B | 2/2005 | |
| GB | 2471809 B | 8/2012 | |
| IE | 20030003 A1 | 7/2003 | |
| PT | 2012014022 W | 4/2013 | |
| WO | 2009133250 A1 | 11/2009 | |
| WO | 2012014022 A2 | 2/2012 | |
| WO | 2012014022 A3 | 4/2012 | |
| WO | 2012014022 A8 | 11/2013 | |
| WO | 2014087062 A1 | 6/2014 | |

OTHER PUBLICATIONS

Corresponding Chinese Patent Application No. 201780044297.3, First Office Action dated Apr. 20, 2020. English Translation.

Telecommunications Engineering Company, Telenco Catalog, Jan. 8, 2016, pp. 1-14.

Photographs of Telenco Thimble available as of Jan. 8, 2016, 1 page.

Telenco Distribution, Fixation et Armement Pour Reseaux Aeriens, Version 1-1207, pp. 1-48, Jan. 8, 2016.

* cited by examiner ize: 15px;"># SUPPORT STRUCTURE FOR SUPPORTING A CABLE

CROSS-REFERENCE TO RELATED APPLICATIONS

This application claims priority to U.S. Provisional Patent Application No. 62/341,335, filed on May 25, 2016, the entire disclosure of which is hereby incorporated by reference.

TECHNICAL FIELD

The instant application is directed towards a support structure. For example, the instant application is directed towards a support structure for supporting a cable.

BACKGROUND

Support structures can be used for supporting a cable, a wire, or the like. The cable, wire, etc. can be at least partially wound around the support structure.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a support structure for supporting a cable is provided. The support structure comprises a body portion extending circumferentially about an axis. The body portion comprises a first wall, a second wall extending substantially parallel to the first wall, and a third wall coupled between the first wall and the second wall. The first wall, the second wall, and the third wall define an opening extending along a circumferential length of the body portion. The body portion is configured to receive the cable within the opening. A retention structure is coupled to the first wall and projects from the first wall towards the second wall. The retention structure extends substantially parallel to the third wall. The retention structure is configured to retain the cable within the opening.

In another example, a support structure for supporting a cable is provided. The support structure comprises a body portion extending circumferentially about an axis. The body portion comprises a first wall, a second wall extending substantially parallel to the first wall, and a third wall coupled between the first wall and the second wall. The first wall, the second wall, and the third wall define an opening extending along a circumferential length of the body portion. The body portion is configured to receive the cable within the opening. A retention structure is coupled to the first wall at a first location and projects from the first wall towards the second wall. The retention structure extends substantially parallel to the third wall and is spaced a distance away from the second wall. The retention structure is configured to retain the cable within the opening. A second retention structure is coupled to the second wall at a second location and projects from the second wall towards the first wall. The second retention structure extends substantially parallel to the third wall and is spaced a second distance away from the first wall. The second retention structure is configured to retain the cable within the opening.

In another example, a support structure for supporting a cable is provided. The support structure comprises a body portion extending circumferentially about an axis. The body portion comprises a first wall, a second wall extending substantially parallel to the first wall, and a third wall coupled between the first wall and the second wall. The first wall, the second wall, and the third wall define an opening extending along a circumferential length of the body portion. The body portion is configured to receive the cable within the opening. A retention structure is coupled to the first wall. The retention structure is movable between a first orientation, in which the retention structure extends substantially perpendicularly to the third wall, and a second orientation, in which the retention structure extends substantially parallel to the third wall. The retention structure is configured to retain the cable within the opening when the retention structure is in the second orientation.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
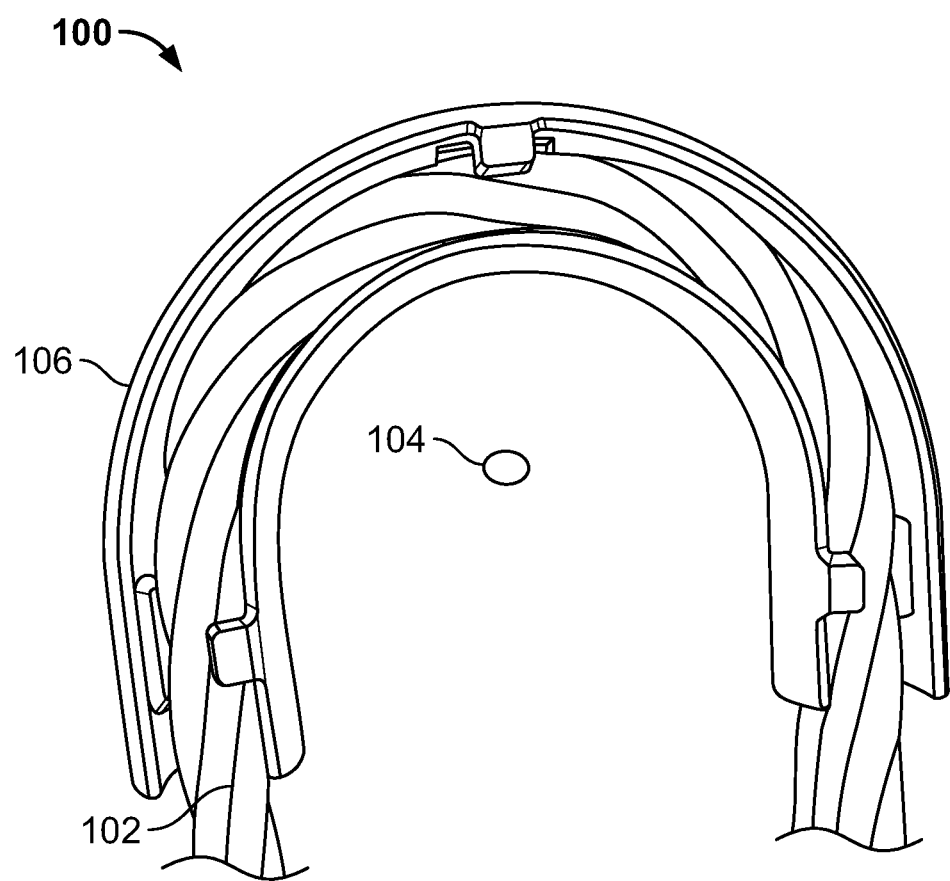
FIG. 1 is an illustration of a first example support structure.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, a support structure 100 is illustrated. The support structure 100 can support a cable 102. In an example, the cable 102 may comprise a braided cable. The cable 102 can be bent and/or looped such that the support structure 100 may support an end of the cable 102. The support structure 100 can support and maintain the cable 102 in a partially bent configuration, in which the support structure 100 and the cable 102 extend circumferentially about an axis 104. In the illustrated example, the cable 102 can be bent substantially 180 degrees, such that the cable can extend from a first direction, be wound by the support structure 100, and continue to extend back in the first direction. It will be appreciated that the term "cable," as used herein, may comprise a loop of a dead-end structure. As such, in an example, the cable 102 comprises a loop of a dead-end termination that may connect a structure (e.g., a second cable, etc.) to a pole structure.

The support structure 100 comprises a body portion 106. The body portion may extend circumferentially about the axis 104. The body portion 106 may comprise any number of materials, such as metal materials, non-metal materials, plastic materials, composite materials, etc. In some examples, the body portion 106 may be substantially rigid and/or non-flexible, such that the body portion 106 is substantially resistant to undesired flexing, torsion, bending, etc. In another example, the body portion 106 may comprise a metallic material, such that some portions of the body portion 106 can be bent and/or moved in response to an applied force.

Figure 2:
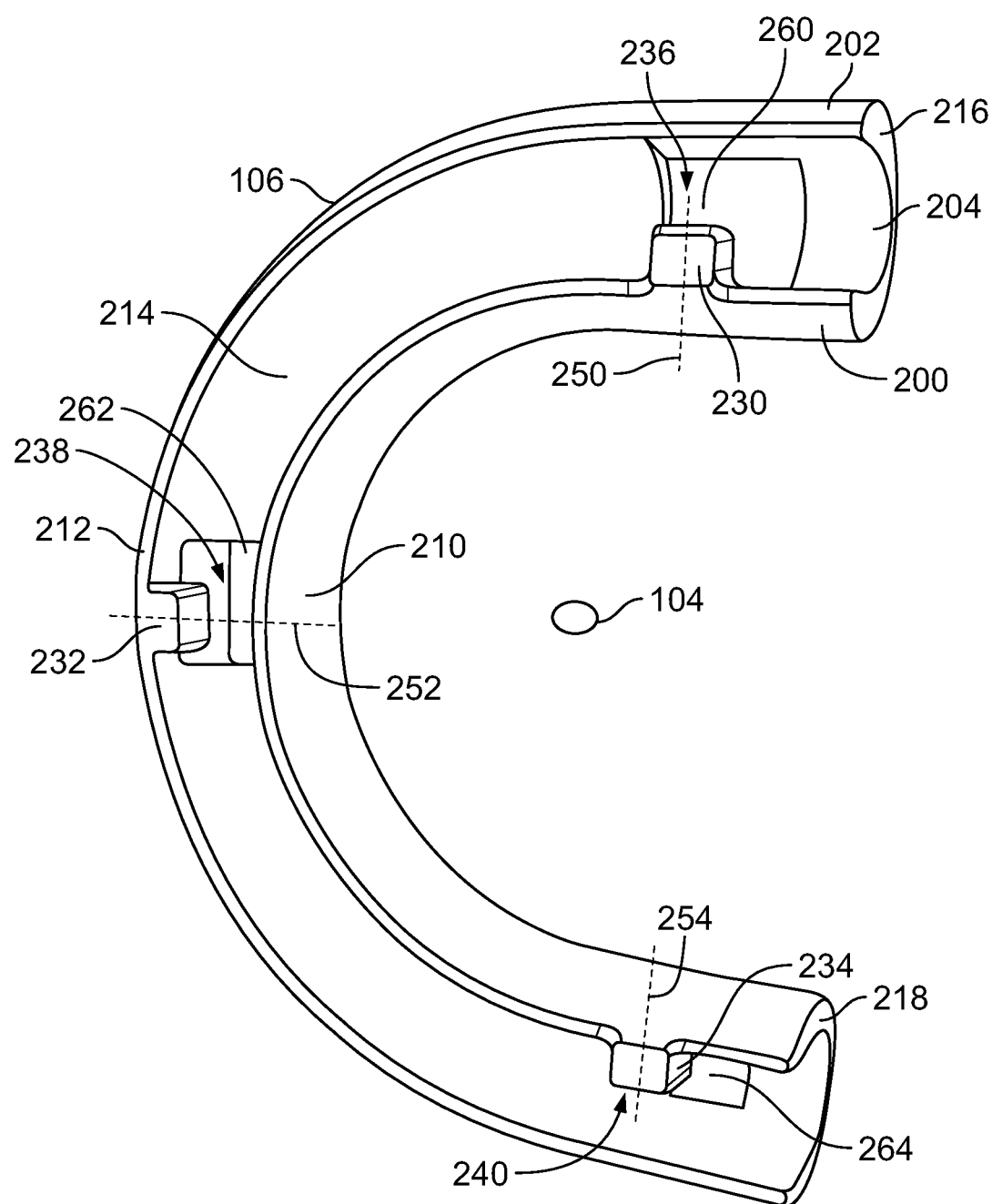
FIG. 2 is an illustration of a first example support structure.

Turning to FIG. 2, the body portion 106 is illustrated. It will be appreciated that the body portion 106 is illustrated without the cable 102 in FIG. 2 for the purposes of illustration, and to more clearly illustrated portions of the body portion 106. In operation, however, the body portion 106 can support the cable 102 in a similar manner as illustrated in FIG. 1.

The body portion 106 may comprise a first wall 200, a second wall 202, and a third wall 204. The first wall 200, the second wall 202, and the third wall 204 can extend circumferentially about the axis 104. In an example, the first wall 200 may define an inner radial side 210 of the body portion 106. The second wall 202 may define an outer radial side 212 of the body portion 106. In an example, the second wall 202 can extend substantially parallel to the first wall 200 about the axis 104.

The third wall 204 can extend between the first wall 200 and the second wall 202. For example, the third wall 204 can be coupled to the first wall 200 and the second wall 202. In such an example, a first edge of the third wall 204 can be coupled to the first wall 200 while an opposing second edge of the third wall 204 can be coupled to the second wall 202.

The first wall 200, the second wall 202, and the third wall 204 can define an opening 214. The opening 214 can extend along a circumferential length of the body portion 106. That is, the opening 214 can extend between a first end 216 of the body portion 106 and a second end 218 of the body portion 106. In this example, the opening 214 can be defined between the inner radial side 210 of the body portion 106 and the outer radial side 212 of the body portion 106. As such, the opening 214 can be bounded by the first wall 200 at the inner radial side 210 and by the second wall 202 at the outer radial side 212. The opening 214 can be bounded on one lateral side by the third wall 204 and may be unbounded on an opposing lateral side.

The inner radial side 210 can have a smaller circumference than the outer radial side 212. In this example, the inner radial side 210 may have a smaller circumferential length than the second wall 202. In an example, the outer radial side 212 can have a larger circumferential length than the first wall 200.

The body portion 106 is configured to receive the cable 102 within the opening 214. For example, the opening 214 may be sized to accommodate the cable 102. In such an example, the opening 214 may have a cross-sectional size that is at least as large as a cross-sectional size of the cable 102, such that the cable 102 can be received within the opening 214. In some examples, the opening 214 can define a relatively tight fit for the cable 102, such that the cable 102 is substantially limited from inadvertent moving, sliding, etc. In such an example, the cable 102 may be in contact with the first wall 200, the second wall 202, and the third wall 204 when received within the opening 214.

The body portion 106 may comprise one or more retention structures. In an example, the body portion 106 comprises a retention structure 230, a second retention structure 232, and a third retention structure 234. While three retention structures are illustrated in FIG. 2, it will be appreciated that any number of retention structures, at a number of different positions, are envisioned.

The retention structure 230 may be coupled to the first wall 200. The retention structure 230 can project from the first wall 200 towards the second wall 202. In an example, the retention structure 230 can be integrally formed with the first wall 200 (e.g., as a one piece formed structure). In another example, the retention structure 230 can be separately attached to the first wall 200, such as with adhesives, mechanical fasteners, bonding (e.g., welding, etc.), etc. In these examples, the retention structure 230 can retain the cable 102 within the opening 214.

The retention structure 230 can extend substantially parallel to the third wall 204 and may be spaced a distance away from the second wall 202. As such, the retention structure 230 can define a gap 236 located between an end of the retention structure 230 and the second wall 202. The gap 236 can have a reduced distance as compared to a distance between the first wall 200 and the second wall 202. This reduced gap distance of the gap 236 can allow for a snap-fit between the body portion 106 and the cable 102.

The second retention structure 232 may be coupled to the second wall 202. The second retention structure 232 can project from the second wall 202 towards the first wall 200. In an example, the second retention structure 232 can be integrally formed with the second wall 202 (e.g., as a one piece formed structure). In another example, the second retention structure 232 can be separately attached to the second wall 202, such as with adhesives, mechanical fasteners, bonding (e.g., welding, etc.), etc. In these examples, the second retention structure 232 can assist in retaining the cable 102 within the opening 214.

The second retention structure 232 can extend substantially parallel to the third wall 204 and may be spaced a distance away from the first wall 200. As such, the second retention structure 232 can define a second gap 238 located between an end of the second retention structure 232 and the first wall 200. The second gap 238 can have a reduced distance as compared to a distance between the first wall 200 and the second wall 202.

The third retention structure 234 may be coupled to the first wall 200. The third retention structure 234 can project from the first wall 200 towards the second wall 202. In an example, the third retention structure 234 can be integrally formed with the first wall 200 (e.g., as a one piece formed structure). In another example, the third retention structure 234 can be separately attached to the first wall 200, such as with adhesives, mechanical fasteners, bonding (e.g., welding, etc.), etc. In these examples, the third retention structure 234 can retain the cable 102 within the opening 214.

The third retention structure 234 can extend substantially parallel to the third wall 204 and may be spaced a distance away from the second wall 202. As such, the third retention structure 234 can define a third gap 240 located between an end of the third retention structure 234 and the second wall 202. The third gap 240 can have a reduced distance as compared to a distance between the first wall 200 and the second wall 202. In some examples, the gap 236, the second gap 238, and the third gap 240 can have substantially similar dimensions.

In an example, the retention structures 230, 232, 234 can have similar or identical shapes. For example, the retention structures 230, 232, 234 may have a substantially cubic shape with a quadrilateral cross-sectional shape. In such an example, a side of the cubic shape may be coupled to an inner surface of the first wall 200 or the second wall 202.

In an example, the retention structure 230 can extend along a retention structure axis 250. In another example, the second retention structure 232 can extend along a second retention structure axis 252. In an example, the third retention structure 234 can extend along a third retention structure axis 254. In the illustrated axis, the second retention structure axis 252 may be non-parallel with respect to the retention structure axis 250 and the third retention structure axis 254. In a possible example, the retention structure axis 250 and the third retention structure axis 254 may be substantially parallel to each other and/or coaxial with respect to each other.

The retention structure 230, the second retention structure 232, and the third retention structure 234 can be positioned to assist in retaining the cable 102 within the opening 214. For example, the retention structure 230 can be positioned adjacent to the first end 216 and/or spaced a distance apart from the first end 216. Such a distance may be less than double the width (e.g., with the width being measured in a direction that is along a length of the body portion 106 between the first end 216 and the second end 218) of the retention structure 230.

The third retention structure 234 can be positioned adjacent to the second end 218 and/or spaced a distance apart from the second end 218. Such a distance may be less than double the width (e.g., with the width being measured in a direction that is along a length of the body portion 106 between the first end 216 and the second end 218) of the third retention structure 234.

The second retention structure 232 can be positioned substantially at a midpoint of the body portion 106. As such, the second retention structure 232 can be located at a maximum distance as measured from an axis intersecting the first end 216 and the second end 218 of the body portion 106. In this example, a distance separating the retention structure 230 and the second retention structure 232 may substantially match a distance separating the retention structure 230 and the third retention structure 234. In this example, the second retention structure 232 can be located a substantially same distance from the first end 216 and the second end 218 as measured along a length of the body portion 106. In this example, the second retention structure 232 may be located a maximum distance from the first end 216 and the second end 218 as measured along a length of the body portion 106. In this way, the cable 102 can be retained by the retention structure 230 and the third retention structure 234 at the first end 216 and the second end 218, respectively. The cable 102 may be retained by the second retention structure 232 at a midpoint of the body portion 106.

In some examples, the body portion 106 comprises one or more support openings. For example, the body portion 106 may comprise a first support opening 260, a second support opening 262, and a third support opening 264. The first support opening 260 can be defined within the third wall 204 adjacent to the retention structure 230. The second support opening 262 can be defined within the third wall 204 adjacent to the second retention structure 232. The third support opening 264 can be defined within the third wall adjacent to the third retention structure 234. In an example, the support openings 260, 262, 264 can allow for the body portion 106 to have a reduced weight while still having a sufficient strength to support the cable 102. In addition or in the alternative, the support openings 260, 262, 264 can be provided as a result of the manufacturing of the body portion 106.

Figure 3:
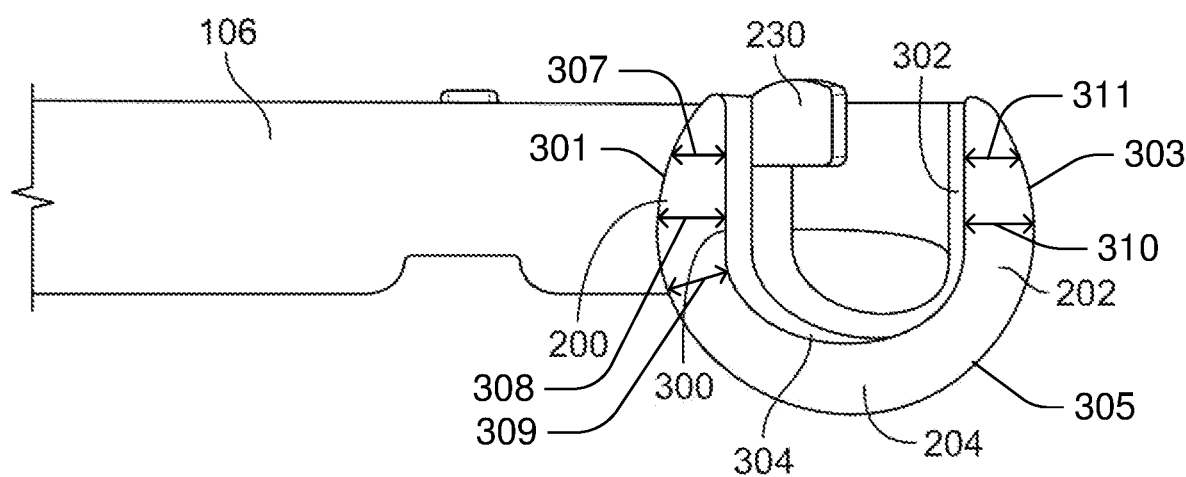
FIG. 3 is an illustration of a first example support structure.

Turning to FIG. 3, an end view of the first end 216 of the body portion 106 is illustrated. It will be appreciated that the second end 218 may be substantially similar and/or identical to the first end 216. Likewise, while the retention structure 230 is illustrated in FIG. 3, a side/end view of the second retention structure 232 and the third retention structure 234 may be substantially similar and/or identical in dimension, shape, etc.

The retention structure 230 can extend along the retention structure axis 250 in a direction that is substantially parallel to the third wall 204. Likewise, the second retention structure 232 and the third retention structure 234 can extend along the second retention structure axis 252 and the third retention structure axis 254, respectively, in directions that are substantially parallel to the third wall 204. In an example, an upper surface of the retention structures 230, 232, 234 (e.g., on an opposite side from the third wall 204) may be substantially planar with an upper surface of the first wall 200 and the second wall 202.

The first wall 200 can define a first inner surface 300 and a first outer surface 301. In an example, the first inner surface 300 of the first wall 200 may be substantially planar. In some examples, the first inner surface 300 is separated from the first outer surface 301 of the first wall 200 by a first distance 307 at a first location and is separated from the first outer surface 301 of the first wall 200 by a second distance 308 at a second location. In some examples, the second distance 308 is greater than the first distance 307.

The second wall 202 can define a second inner surface 302 and a second outer surface 303. In an example, the second inner surface 302 may be substantially planar. In some examples, the first inner surface 300 is substantially parallel to the second inner surface 302. The third wall 204 can define a third inner surface 304 and a third outer surface 305. In an example, the third inner surface 304 is non-planar and may extend at least partially circumferentially about a third axis. In some examples, the third inner surface 304 of the third wall 204 is separated from the third outer surface 305 of the third wall by a third distance 309 at a third location. In some examples, the second location is between the first location and the third location. In some examples, the third distance 309 is less than the second distance 308.

In some examples, the second inner surface 302 of the second wall 202 is separated from the second outer surface 303 of the second wall 202 by a fourth distance 310 at a fourth location. In some examples, the second inner surface 302 of the second wall 202 is separated from the second outer surface 303 of the second wall 202 by a fifth distance 311 at a fifth location. In some examples, the fourth location is between the third location and the fifth location. In some examples, the fourth distance 310 is greater than the fifth distance 311 and the fourth distance 310 is greater than the third distance 309.

It will be appreciated that the first inner surface 300 and the second inner surface 302 are not limited to being substantially planar. Rather, in some examples, the first inner surface 300 and the second inner surface 302 may be non-planar, and may have a bend, a curvature, etc. In some examples, the third inner surface 304 is not limited to being substantially non-planar. Rather, the third inner surface 304 may be substantially flat and planar.

The opening 214 can be defined at least partially between the retention structures 230, 232, 234, the first wall 200, the second wall 202, and the third wall 204. In this example, a bottom surface of the retention structures 230, 232, 234 can be spaced apart from the third wall 204 to at least partially define the opening 214. As such, the cable 102 can be retained within the opening 214 by the retention structures 230, 232, 234. The cable 102 can contact, engage, etc. the bottom surface of the retention structures 230, 232, 234 to limit the cable 102 from inadvertently being removed from the opening 214.

In operation, the cable 102 can be inserted into the opening 214 by snapping the cable 102 into the opening 214 from above the body portion 106. Once the cable has been inserted into the opening 214, the cable 102 can be retained by the retention structures 230, 232, 234.

Figure 4:
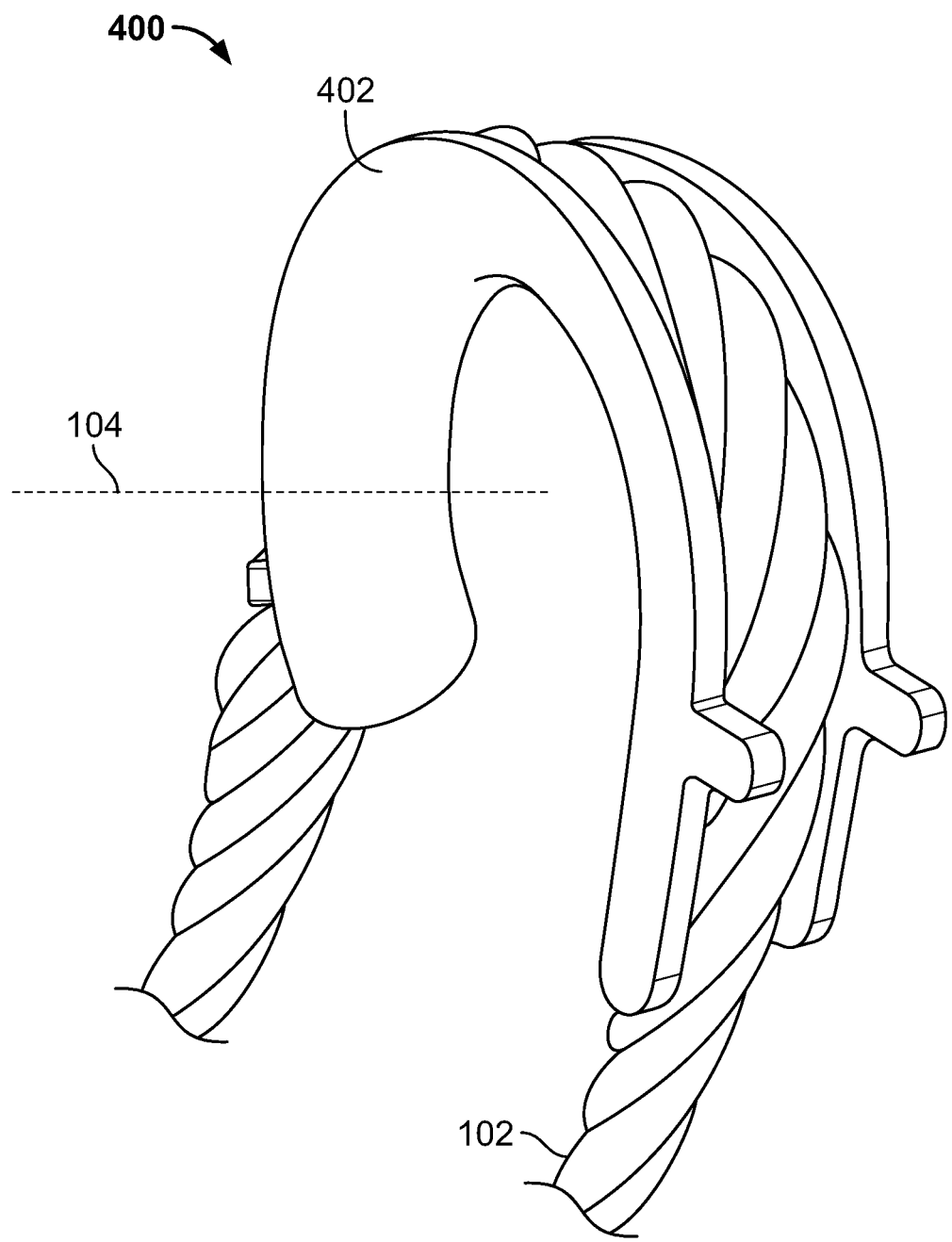
FIG. 4 is an illustration of a second example support structure.

Turning to FIG. 4, a second example support structure 400 is illustrated. The support structure 400 can support the cable 102. In an example, the support structure 400 comprises a body portion 402 that may extend circumferentially about the axis 104. The support structure 400 can support and maintain the cable 102 in a partially bent configuration, in which the support structure 400 and the cable 102 extend circumferentially about the axis 104.

The body portion 402 may comprise any number of materials, such as metal materials, non-metal materials, plastic materials, composite materials, etc. In the illustrated example, the body portion 402 may comprise a metal material, such that a portion of the body portion 402 can be bent and/or moved in response to an applied force.

Figure 5:
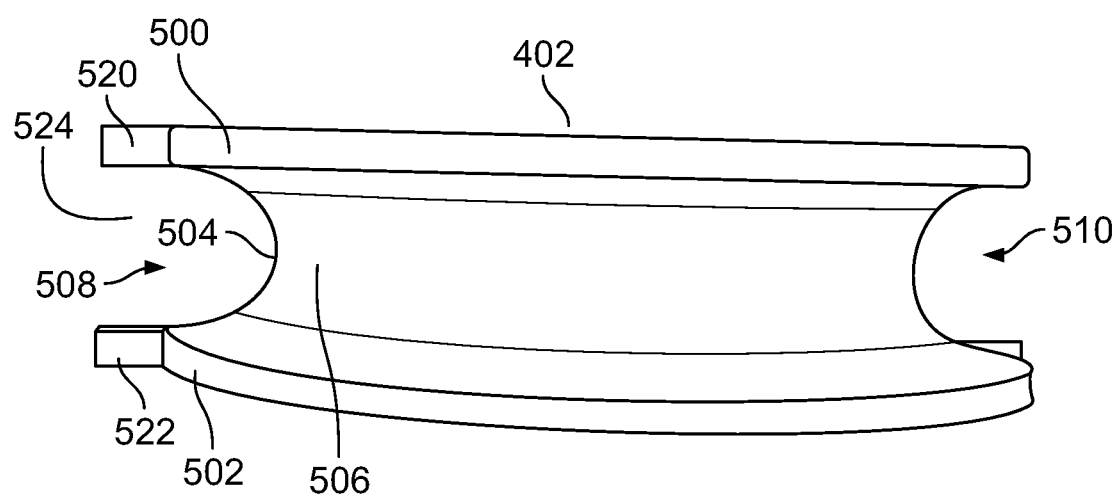
FIG. 5 is an illustration of a second example support structure.

Turning to FIG. 5, the body portion 402 is illustrated. It will be appreciated that the body portion 402 is illustrated without the cable 102 in FIG. 5 for the purposes of illustration, and to more clearly illustrated portions of the body portion 402. In operation, however, the body portion 402 can support the cable 102 in a similar manner as illustrated in FIG. 4.

The body portion 402 may comprise a first wall 500, a second wall 502, and a third wall 504. The first wall 500, the second wall 502, and the third wall 504 can extend circumferentially about the axis 104. In an example, the third wall 504 may define an inner radial side 506 of the body portion 402. The first wall 500 and the second wall 502 can define lateral sides of the body portion 402. The first wall 500, the second wall 502, and the third wall 504 can define an opening 508 that borders an outer radial side 510 of the body portion 402.

In an example, the second wall 502 can extend substantially parallel to the first wall 500 about the axis 104. The third wall 504 can extend between the first wall 500 and the second wall 502. For example, the third wall 504 can be coupled to the first wall 500 and the second wall 502. In such an example, a first edge of the third wall 504 can be coupled to the first wall 500 while an opposing second edge of the third wall 504 can be coupled to the second wall 502.

The first wall 500, the second wall 502, and the third wall 504 can define the opening 508. The opening 508 can extend along a circumferential length of the body portion 402. That is, the opening 508 can extend between a first end of the body portion 402 and a second end of the body portion 402. In this example, the opening 508 can be defined between the inner radial side 506 of the body portion 402 and the outer radial side 510 of the body portion 402. As such, the opening 508 can be bounded by the third wall 504 at the inner radial side 506 and may be unbordered at the outer radial side 510.

The body portion 402 is configured to receive the cable 102 within the opening 508. For example, the opening 508 may be sized to accommodate the cable 102. In such an example, the opening 508 may have a cross-sectional size that is at least as large as a cross-sectional size of the cable 102, such that the cable 102 can be received within the opening 508. In some examples, the opening 508 can define a relatively tight fit for the cable 102, such that the cable 102 is substantially limited from inadvertent moving, sliding, etc. In such an example, the cable 102 may be in contact with the first wall 500, the second wall 502, and the third wall 504 when received within the opening 508.

The body portion 402 may comprise one or more retention structures. In an example, the body portion 402 comprises a retention structure 520 and a second retention structure 522. While two retention structures are illustrated in FIG. 5, it will be appreciated that any number of retention structures, at a number of different positions, are envisioned. The retention structure 520 can be coupled to the first wall 500 while the second retention structure 522 can be coupled to the second wall 502.

The retention structure 520 and the second retention structure 522 are illustrated in a first orientation in FIG. 5. In the first orientation, the retention structure 520 may project substantially parallel to the first wall 500. The retention structure 520 can be integrally formed with the first wall 500 (e.g., as a one piece formed structure). In another example, the retention structure 520 can be separately attached to the first wall 500, such as with adhesives, mechanical fasteners, bonding (e.g., welding, etc.), etc. In these examples, the retention structure 520 can retain the cable 102 within the opening 508.

In the first orientation, the second retention structure 522 may extend substantially parallel to the second wall 502. The second retention structure 522 can be integrally formed with the second wall 502 (e.g., as a one piece formed structure). In another example, the second retention structure 522 can be separately attached to the second wall 502, such as with adhesives, mechanical fasteners, bonding (e.g., welding, etc.). In these examples, the second retention structure 522 can retain the cable 102 within the opening 508.

In the first orientation, the retention structure 520 and the second retention structure 522 can extend substantially perpendicularly to the third wall 504. The retention structure 520 and the second retention structure 522 may be spaced a distance apart from each other (e.g., the same distance that the first wall 500 and the second wall 502 are spaced apart). As such, the retention structure 520 and the second retention structure 522 may define a gap 524 therebetween. In an example, the gap 524 may be sized to be equal to or larger than a cross-sectional size of the cable 102. As such, the gap 524 can allow for the cable 102 to be inserted into the opening 508 and/or to be removed from the opening 508.

Figure 6:
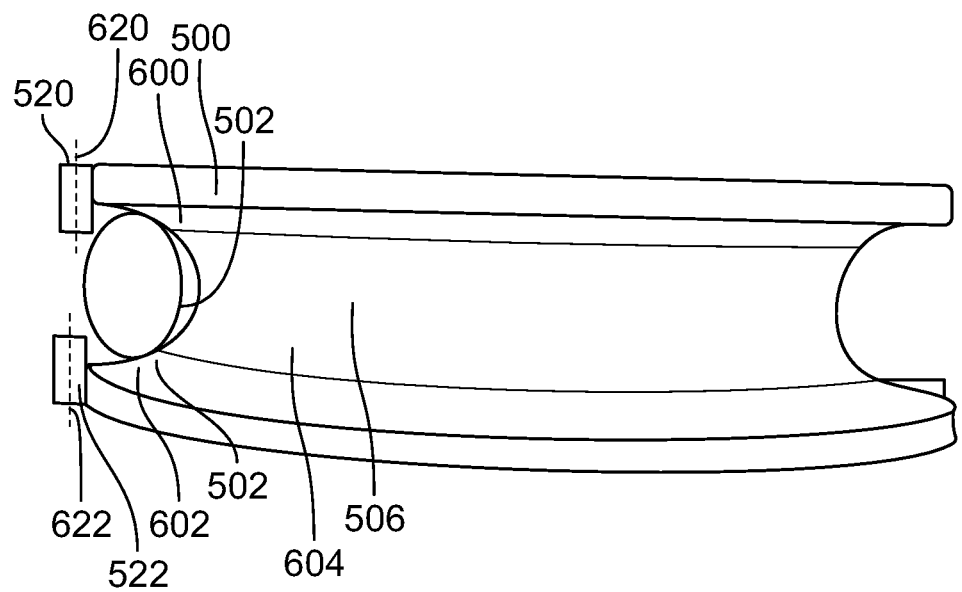
FIG. 6 is an illustration of a second example support structure.

Turning to FIG. 6, the retention structure 520 and the second retention structure 522 can be moved from the first orientation (e.g., as illustrated in FIG. 5) to a second orientation (e.g., as illustrated in FIG. 6). In the second orientation, the retention structure 520 can be moved to extend substantially parallel to the third wall 504 and substantially perpendicular to the first wall 500 and the second wall 502. In the second orientation, the second retention structure 522 can be moved to extend substantially parallel to the third wall 504 and substantially perpendicular to the first wall 500 and the second wall 502. In an example, in the second orientation, the retention structure 520 and the second retention structure 522 can extend substantially parallel to each other and co-planar with respect to each other.

In an example, the retention structure 520 can extend along a retention structure axis 620 when the retention structure 520 is in the second orientation. In an example, the second retention structure 522 can extend along a second retention structure axis 622 when the second retention structure 522 is in the second orientation. In some examples, the retention structure axis 620 and the second retention structure axis 622 may be substantially parallel. In the illustrated example, the retention structure axis 620 and the second retention structure axis 622 may be substantially co-axial, since the retention structure 520 and the second retention structure 522 are located at matching and opposing locations of the first wall 500 and the second wall 502, respectively.

With the retention structure 520 and the second retention structure 522 in the second orientation, the body portion 402 can support the cable 102 within the opening 508. For example, the cable 102 can contact a first inner surface 600 of the first wall 500, a second inner surface 602 of the second wall 502, and/or a third inner surface 604 of the third wall 504.

In an example, the first inner surface 600 may be substantially planar. In an example, the second inner surface 602 may be substantially planar. In an example, the third inner surface 604 may be non-planar and may extend at least partially circumferentially about a third axis. The opening 508 can therefore bet defined at least partially between the retention structures (520, 522), the first wall 500, the second wall 502, and the third wall 504. In the second orientation, the retention structure 520 and the second retention structure 522 can be spaced apart from the third wall 204 to at least partially define the opening 508. As such, the cable 102 can be retained within the opening 508 by the retention structures (520, 522).

In the example of FIGS. 4 to 6, the body portion 402 may comprise a material that has at least some degree of flexibility and/or pliability in response to a force, such as a metal material (e.g., or other materials that have at least some degree of ductility). In such an example, a force can be applied to the retention structure 520 and the second retention structure 522 to cause the retention structure 520 and the second retention structure 522 to move from the first orientation to the second orientation. As such, when the retention structure 520 and the second retention structure 522 are in the first orientation, the cable 102 can be inserted into the opening 508. With the cable 102 positioned within the opening 508, the retention structure 520 and the second retention structure 522 can be moved to the second orientation (e.g., due to a force being applied to the retention structure 520 and the second retention structure 522). In the second orientation, the retention structure 520 and the second retention structure 522 can retain the cable 102 within the opening 508.

The support structure 100, 400 described herein provides a number of benefits. For example, the support structure 100, 400 can support a cable 102. In addition, due to the curved and/or rounded configuration of the support structure 100, 400, wear and fatigue on the cable 102 is reduced (e.g., in response to movement caused by wind, etc.). Such a reduction in wear on the cable 102 (e.g., a loop of a dead-end) is beneficial due to a reduced likelihood of fatigue on the cable 102. In an example, the support structure 100, 400 can meet bend radius requirements to limit fatigue and to allow for long term performance. The retention structures can avoid lost components and allow for relatively easier handling during installation with a reduced likelihood of lost parts. Materials may be selected for chemical, electrical, mechanical, or corrosion resistant properties to meet application requirements.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A support structure for supporting a cable, the support structure comprising:

a body portion extending circumferentially about an axis, the body portion comprising:
  a first wall;
  a second wall extending substantially parallel to the first wall; and
  a third wall coupled between the first wall and the second wall, wherein:
    a first surface of the first wall, a first surface of the second wall, and a first surface of the third wall define an opening extending along a circumferential length of the body portion,
    the body portion is configured to receive the cable within the opening,
    a second surface of the first wall is diametrically opposite the first surface of the first wall,
    a second surface of the second wall is diametrically opposite the first surface of the second wall, and
    a second surface of the third wall is diametrically opposite the first surface of the third wall;
a first retention structure coupled to the first wall and projecting from the first wall towards the second wall, wherein:
  the first retention structure extends substantially parallel to the third wall,
  the first retention structure is configured to retain the cable within the opening,
  at a cross-section of the body portion, only a single retention structure contacts the body portion,
  at the cross-section of the body portion, the first surface of the first wall, the first surface of the second wall, and the first surface of the third wall together define a u-shaped surface, and
  at the cross-section of the body portion, the second surface of the first wall, the second surface of the second wall, and the second surface of the third wall together define a c-shaped surface; and
a second retention structure coupled to the first wall and projecting from the first wall towards the second wall.

2. The support structure of claim 1, comprising:
a third retention structure coupled to the second wall and projecting from the second wall towards the first wall, wherein:
  the third retention structure extends substantially parallel to the third wall,
  the third retention structure is configured to retain the cable within the opening, and
  the third retention structure is at a mid-point between the first retention structure and the second retention structure.

3. The support structure of claim 1, wherein the first wall defines an inner radial side of the body portion.

4. The support structure of claim 3, wherein the second wall defines an outer radial side of the body portion.

5. The support structure of claim 1, wherein:
the first wall defines an inner radial side of the body portion,
the second wall defines an outer radial side of the body portion,
the body portion extends from a first end to a second end, and
the second wall extends continuously between the first end and the second end.

6. A cable system comprising:
a cable; and
a support structure for supporting the cable, the support structure comprising:
  a body portion extending circumferentially about an axis, the body portion comprising:
    a first wall defining an inner radial side of the body portion;
    a second wall extending substantially parallel to the first wall and defining an outer radial side of the body portion; and
    a third wall coupled between the first wall and the second wall, wherein:
      at a cross-section of the body portion, a first surface of the first wall, a first surface of the second wall, and a first surface of the third wall together define a c-shaped surface,
      at the cross-section of the body portion, a second surface of the first wall, a second surface of the second wall, and a second surface of the third wall together define a u-shaped surface,
      the first wall, the second wall, and the third wall define an opening extending along a circumferential length of the body portion,
      the body portion is configured to receive the cable within the opening,
      the body portion is sized such that upon receiving the cable within the opening, the cable contacts the first wall, the second wall, and the third wall,
      the body portion extends from a first end to a second end, and
      the second wall extends continuously between the first end and the second end; and
  a first retention structure coupled to the first wall at a first location and projecting from the first wall towards the second wall, wherein:
    the first retention structure is spaced a distance away from the second wall, and
    the first retention structure is configured to retain the cable within the opening.

7. The cable system of claim 6, wherein the second surface of the third wall is non-planar and extends circumferentially about a second axis.

8. The cable system of claim 6, the support structure comprising:
a second retention structure coupled to the first wall at a second location and projecting from the first wall towards the second wall.

9. The cable system of claim 8, the support structure comprising:
a third retention structure coupled to the second wall and projecting from the second wall towards the first wall, wherein the third retention structure is at a mid-point between the first retention structure and the second retention structure.

10. The cable system of claim 6, wherein:
the first retention structure projects from the first wall towards the second wall in a first direction along a retention structure axis, and
the retention structure axis and the cross-section of the body portion are co-planar.

11. The cable system of claim 6, wherein:
the third wall defines a support opening extending through the third wall, and
the support opening is disposed diametrically opposite the first retention structure relative to the cable when the cable is disposed within the opening.

12. A support structure for supporting a cable, the support structure comprising:

a body portion extending circumferentially about an axis, the body portion comprising:
  a first wall;
  a second wall extending substantially parallel to the first wall; and
  a third wall coupled between the first wall and the second wall, wherein:
    a first surface of the first wall, a first surface of the second wall, and
  a first surface of the third wall define an opening,
    the body portion is configured to receive the cable within the opening,
    the body portion extends from a first end to a second end,
    the first end and the second end face in a same direction,
    each of the first wall and the second wall extends continuously between the first end and the second end,
    a second surface of the first wall is diametrically opposite the first surface of the first wall,
    the first surface of the first wall is separated from the second surface of the first wall by a first distance at a first location,
    the first surface of the first wall is separated from the second surface of the first wall by a second distance at a second location, and
    the first distance is different than the second distance; and
  a retention structure coupled to the first wall and projecting from the first wall towards the second wall, the retention structure configured to retain the cable within the opening.

13. The support structure of claim 12, wherein the third wall defines a support opening extending through the third wall.

14. The support structure of claim 13, wherein the support opening is disposed diametrically opposite the retention structure relative to the cable when the cable is disposed within the opening.

15. The support structure of claim 12, wherein:
the second distance is greater than the first distance,
a second surface of the third wall is diametrically opposite the first surface of the third wall,
the first surface of the third wall is separated from the second surface of the third wall by a third distance at a third location,
the second location is between the first location and the third location, and
the third distance is less than the second distance.

16. The support structure of claim 15, wherein:
a second surface of the second wall is diametrically opposite the first surface of the second wall,
the first surface of the second wall is separated from the second surface of the second wall by a fourth distance at a fourth location,
the first surface of the second wall is separated from the second surface of the second wall by a fifth distance at a fifth location,
the fourth location is between the third location and the fifth location,
the fourth distance is greater than the fifth distance, and
the fourth distance is greater than the third distance.

17. The support structure of claim 12, wherein at a cross-section of the body portion, only a single retention structure contacts the body portion.

18. The support structure of claim 17, wherein:
the retention structure projects from the first wall towards the second wall in a first direction along a retention structure axis, and
the retention structure axis and the cross-section of the body portion are co-planar.

19. The support structure of claim 12, wherein:
a second surface of the second wall is diametrically opposite the first surface of the second wall,
a second surface of the third wall is diametrically opposite the first surface of the third wall, and
at a cross-section of the body portion, the second surface of the first wall, the second surface of the second wall, and the second surface of the third wall together define a c-shaped surface.

20. The support structure of claim 19, wherein at the cross-section of the body portion, the first surface of the first wall, the first surface of the second wall, and the first surface of the third wall together define a u-shaped surface.

* * * * *